United States Patent [19]
Gras et al.

[11] Patent Number: 5,881,700
[45] Date of Patent: Mar. 16, 1999

[54] TANK VENTING DEVICE FOR MOTOR VEHICLES

[75] Inventors: Juergen Gras, Bietigheim-Bissingen; Andreas Blumenstock, Ludwigsburg; Georg Mallebrein, Singen, all of Germany

[73] Assignee: Robert Bosch GmbH, Stuttgart, Germany

[21] Appl. No.: 937,791

[22] Filed: Sep. 24, 1997

[30] Foreign Application Priority Data

Sep. 24, 1996 [DE] Germany ............ 1 96 39 116.4

[51] Int. Cl.$^6$ .................................... F02M 37/04
[52] U.S. Cl. ............................................. 123/520
[58] Field of Search .................. 123/516, 518, 123/519, 520

[56] References Cited

U.S. PATENT DOCUMENTS

| | | | |
|---|---|---|---|
| 5,146,902 | 9/1992 | Cook et al. .................. | 123/520 |
| 5,273,020 | 12/1993 | Hayami . | |
| 5,297,529 | 3/1994 | Cook et al. .................. | 123/520 |
| 5,349,935 | 9/1994 | Mezger et al. ............. | 123/520 |
| 5,411,004 | 5/1995 | Busato et al. ............. | 123/520 |
| 5,450,834 | 9/1995 | Yamanaka et al. ........ | 123/520 |
| 5,635,630 | 6/1997 | Dawson et al. ............ | 123/520 |

FOREIGN PATENT DOCUMENTS

| | | |
|---|---|---|
| 25 47 065 A1 | 9/1977 | Germany . |
| 41 24 465 A1 | 1/1993 | Germany . |

*Primary Examiner*—Thomas N. Moulis
*Attorney, Agent, or Firm*—Edwin E. Greigg; Ronald E. Greigg

[57] ABSTRACT

A tank venting device for motor vehicles having an internal combustion engine supplied from a fuel tank. The device includes a filter housing, which is connectable to a venting stub of the fuel tank and includes an adsorption filter, whose air inlet is occupied by a shutoff valve and whose air outlet communicates with an intake tube of the engine, and an air feed pump and a diagnosis device. To improve the metering capability for the regeneration mixture aspirated from the filter to the intake tube of the engine, the air feed pump is disposed with a reversible feeding direction between the air outlet of the filter housing and the intake tube of the engine. The air feed pump is controlled in its feeding direction reversal via a multiposition control valve such that the filter housing is located on the intake side of the air feed pump for the duration of filter regeneration, and on the pressure side of the air feed pump for the duration of error diagnosis.

19 Claims, 1 Drawing Sheet

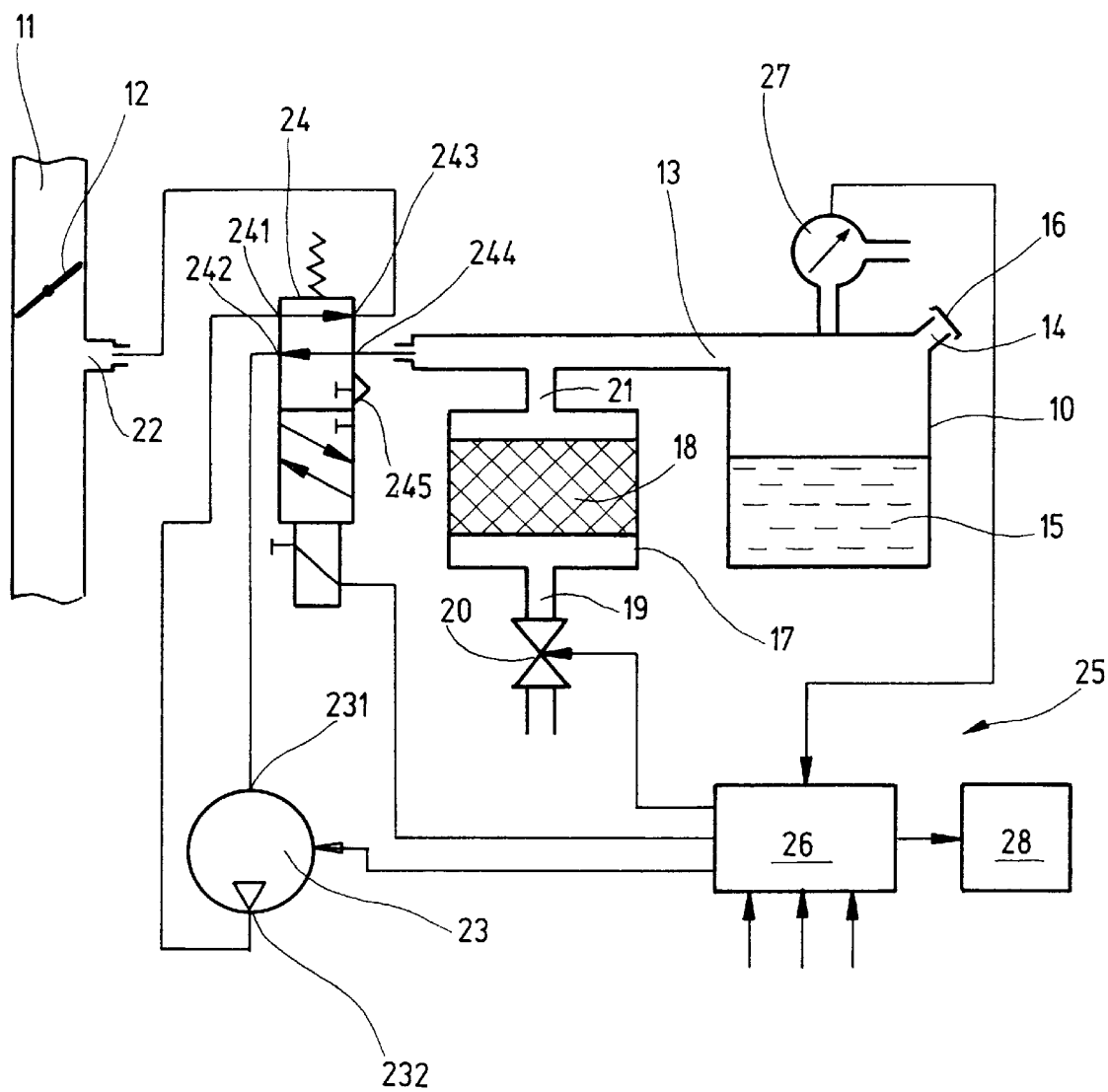

TANK VENTING DEVICE FOR MOTOR VEHICLES

BACKGROUND OF THE INVENTION

The invention is based on a tank venting device for motor vehicles having an internal combustion engine supplied from a fuel tank.

In a known tank venting device of this type (German Patent Disclosure DE 41 24 465A1), the metering of the air stream carried via the adsorption filter for filter regeneration is effected by a tank venting device, which is disposed between the air outlet of the filter housing and the intake tube of the engine and whose opening cross section is controlled as a function of engine operating parameters. Depending on the opening cross section of the tank venting device, and as a consequence of the negative pressure prevailing in the intake tube, a certain quantity of air is aspirated via the adsorption filter, and a corresponding regeneration mixing quantity is delivered to the engine. Since after all, depending on the operating state of the engine, the negative pressure in the intake tube fluctuates severely—for instance, in the upper load range of the engine or in engines without throttle valves there is no negative pressure available—precise metering of the regeneration mixture can be accomplished only with very great difficulty, or not at all.

To make a regeneration mixing quantity available even in internal combustion engines lacking a throttle valve and at full load in the intake tube, in an also-known tank venting device (DE 196 257 02 A1), the air feed pump required by a diagnosis device for error detection in order to generate an overpressure in the tank venting device connected to the fuel tank is utilized to generate the regenerating air flow. To that end, the air feed pump is connected to the air inlet of the filter housing via a bypass and is left on for the duration of filter regeneration. Once again, however, the metering of the air flow—and hence of the regeneration mixture—is effected by the controlled tank venting device located between the air outlet of the filter housing and intake tube of the engine. However, the capacity of the air feed pump must be limited, since when the regenerating air flow is generated air is blown through the fuel tank, and for safety reasons the pressure in the fuel tank must be kept below a maximum pressure of about 50 hPa. Increasing the air quantity without exceeding the maximum allowable tank pressure is possible only by means of a very large guide cross section between the air outlet of the filter housing and the tank venting device.

OBJECT AND SUMMARY OF THE INVENTION

The tank venting device according to the invention has the advantage that an improved metering capability for the regeneration mixture is provided by the disposition of the air feed pump between the adsorption filter and the intake tube of the engine. The regeneration quantity is determined solely by the air feed pump and is independent of the negative pressure in the intake tube of the engine, so that even internal combustion engines without a throttle valve can be equipped with the tank venting device. In the regeneration mode, the pressure in the fuel tank is not increased, so that the capacity of the feed pump need not be limited, nor does a large guide cross section have to be provided.

Advantageous further features of and improvements to the tank venting device are possible with the provisions recited herein.

The air feed pump, in an especially preferred embodiment of the invention, is given a dual function as a regeneration and diagnosis pump; in the regeneration phase, it is operated as a metering pump, whose feeding capacity is controlled as a function of engine operating parameters, such as the rpm. For error diagnosis, the feeding direction of the air feed pump is switched over, and at the same time the shutoff valve at the air inlet of the filter housing is closed. The tank venting device connected to the fuel tank can thus be put under pressure in order to carry out the error diagnosis in the known way.

In a preferred embodiment of the invention, the air feed pump has a pump wheel with a constant direction of rotation and with a pump inlet and pump outlet. For reversing the feeding direction, a switchover valve is provided, which for the duration of filter regeneration connects the pump inlet to the air outlet of the filter housing and the pump outlet to the intake tube of the engine and for the duration of error diagnosis connects the pump outlet to the air outlet of the filter housing and the pump inlet to a vent opening. Such a switchover valve may for instance be embodied by a 5/2-way valve, which is preferably embodied as an electromagnet valve with spring restoration.

In advantageous forms of the invention, the air feed pump is embodied as a piston pump, diaphragm pump or vane cell pump. In such pumps, the feed quantities can be very well adjusted by regulating the rpm of the pump wheel.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing schematically shows a tank venting device for a motor vehicle.

DESCRIPTION OF THE PREFERRED EMBODIMENT

The tank venting device schematically shown in the drawing for a motor vehicle with an internal combustion engine is disposed between a fuel tank 10 and an intake tube 11 with a throttle valve 12 of the engine; the connection to the intake tube 11 is made downstream of the throttle valve 2, and the connection to the fuel tank 10 is made to its venting stub 13. The fuel tank 10 is filled with fuel 15 via a filler stub 14. The filler stub 14 can be closed hermetically and in pressure-tight fashion by means of a tank cap 16.

The tank venting device has a filter housing 17, in which an adsorption filter 18 is replaceably received. The filter housing 17 has an air inlet 19, which is closable with a shutoff valve 20, and an air outlet 21 which is connected on the one hand to the venting stub 13 of the fuel tank 10 and on the other communicates with a connection stub 22 on the intake tube 11 of the engine. Located in the connecting line between the air outlet 21 and the connection stub 22 is an air feed pump 23 with a reversible feeding direction, so that the filter housing 17 is located first on the intake side of the air feed pump 23 and then after a reversal of its feeding direction on the pressure side thereof. In the exemplary embodiment shown in the drawing, the pump rotor is driven in a constant direction of rotation, and the reversal of the feeding direction is effected by means of a switchover valve 24, to which the air feed pump 23 is connected by its pump inlet 231 and its pump outlet 232. The switchover valve 24 is embodied such that on the one hand the pump inlet 231 is connected to the air outlet 21 of the filter housing 17 and the pump outlet 232 is connected to the connection stub 22 of the intake tube 11, and on the other the pump outlet 232 is connected to the air outlet 21 of the filter housing 17 and the pump inlet 231 is ventilated while the connection stub 22 on the intake tube 11 is closed. The air feed pump 23 may be embodied as a piston pump, diaphragm pump or vane cell pump.

In the exemplary embodiment shown in the drawing, the switchover valve 24 is embodied as a 5/2-way magnet valve with spring restoration, but it can also be realized in some other way. Of the five valve connections 241–245, the first valve connection 241 communicates with the pump outlet 232, the second valve connection 242 communicates with the pump inlet 231, the third valve connection 243 communicates with the connection stub 22 of the intake tube 11, and the fourth valve connection 244 communicates with the air outlet 21 of the filter housing 17. The fifth valve connection 245 is embodied as a ventilating connection. In the position of repose or basic position of the multiposition valve 24 as shown in the drawing, in which its electromagnet is not excited, the first valve connection 241 and the third valve connection 243 are connected to one another, and the second valve connection 242 and the fourth valve connection 244 are connected to one another. The ventilating connection 245 is closed. To reverse the feeding direction of the feed pump 23, the electromagnet of the multiposition valve 24 is excited. This valve switches over to its working position, in which now the first valve connection 241 and the fourth valve connection 244 communicate with one another, and the second valve connection 242 and the fifth valve connection 245 communicate with one another, while the third valve connection 243 is closed.

The tank venting device also includes a diagnosis device 25, which serves to check the tank venting device for operability and to detect any possible defects, such as leaks, in the tank venting device. One such diagnosis device 25 is described in terms of its construction and mode of operation in DE 41 24 465 A1, for instance, so that a brief description of it will suffice here. The diagnosis device includes not only the air feed pump 23 and the shutoff valve 20 for generating an overpressure in the fuel tank 10 and filter housing 17 but also a control unit 26 and a differential pressure meter 27 connected to the fuel tank 10. The control unit 26 on the one hand controls the air feed pump 23, the switchover valve 24 and the shutoff valve 20, and on the other it evaluates the pressure values output by the pressure meter 27 and converts them into an error diagnosis, which is displayed in a display unit 28.

The tank venting device described above functions as follows:

The fuel vapors (hydrocarbons) outgassing from the fuel in the tank 10 pass via the venting stub 13 of the tank 10 into the filter housing 17, where they are deposited in the adsorption filter 18. For regenerating the filter 18, the control unit 26 opens the shutoff valve 20 and turns on the air feed pump 23. The air flow aspirated by the feed pump 23 via the opened shutoff valve 20 flows through the filter 17; hydrocarbons deposited in the filter 18 are then entrained. The air and hydrocarbon mixture, generally called the regeneration mixture, leaving the air outlet 21 of the filter housing 17 is blown into the intake tube 11 downstream of the throttle valve 12 by the feed pump 23. The regeneration quantity, blown in as a function of the operating state of the invention, is controlled as a function of engine operating parameters in such a way that the control unit 26 regulates the rpm of the feed pump 23 accordingly. In the simplest case, the rpm of the feed pump 23 is synchronized with the rpm of the engine.

For error diagnosis in the tank venting device, the control unit 26 closes the shutoff valve 20, switches over the switchover as valve 24 by triggering the valve magnet with an exciter current, and also turns on the feed pump 23. The turned-on feed pump 23 produces an overpressure in the tank venting device, including the fuel tank 10, that is required for the error diagnosis. On the basis of the values metered by the differential pressure meter 27, an error diagnosis is made; the diagnostic process may proceed in detail in the way described in DE 41 24 465 A1.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A tank venting device for motor vehicles having an internal combustion engine supplied from a fuel tank, which comprises a filter housing (17), which is connectable to a venting stub (13) of the fuel tank (10), said filter housing includes an adsorption filter (18) for storing fuel vapors arising on fuel outgassing, said filter housing includes an air inlet and air outlet (19, 21) for a meterable air flow that flows through the adsorption filter (18) for filter regeneration, the air flow is delivered via the air outlet (21) to an intake tube (11) of the engine via a switchover valve (24), and includes an air feed pump (23), the air feed pump (23) is connected with a reversible feeding direction to the air outlet (21) of the filter housing (17) via said switchover valve, and the feeding direction of the air feed pump (23) is controlled via said switchover valve, for a duration of filter regeneration, in such a way that the air outlet (21) of the filter housing (17) is located on the intake side of the air feed pump (23).

2. A device in accordance with claim 1, in which the air feed pump (23) is controllable in a feeding capacity as a function of operating parameters of the engine.

3. A device in accordance with claim 2, in which the rpm of the air feed pump (23) is synchronized with the engine rpm and controllable as a function of the rpm of the engine.

4. A device in accordance with claim 1, in which a diagnosis device (25) is provided for error detection and a shutoff valve (20) is disposed at the air inlet (19), said shutoff valve (20) is opened for the duration of filter regeneration and closed for the duration of error diagnosis, and that the feeding direction of the air feed pump (23) for the duration of error diagnosis is controlled via said switchover valve such that the air outlet (21) of the filter housing (17) is located on the pressure side of the air feed pump (23).

5. A device in accordance with claim 2, in which a diagnosis device (25) is provided for error detection and a shutoff valve (20) is disposed at the air inlet (19), said shutoff valve (20) is opened for the duration of filter regeneration and closed for the duration of error diagnosis, and that the feeding direction of the air feed pump (23) for the duration of error diagnosis is controlled via said switchover valve such that the air outlet (21) of the filter housing (17) is located on the pressure side of the air feed pump (23).

6. A device in accordance with claim 3, in which a diagnosis device (25) is provided for error detection and a shutoff valve (20) is disposed at the air inlet (19), said shutoff valve (20) is opened for the duration of filter regeneration and closed for the duration of error diagnosis, and that the feeding direction of the air feed pump (23) for the duration of error diagnosis is controlled via said switchover valve such that the air outlet (21) of the filter housing (17) is located on the pressure side of the air feed pump (23).

7. A device in accordance with claim 4, in which the feed pump (23) has a pump rotor with a constant direction of rotation and with a pump inlet and pump outlet (231, 232), and that for reversing a feeding direction the switchover valve (24) is provided, which for a duration of filter regeneration connects the pump inlet (231) to the air outlet (21) of the filter housing (17) and the pump outlet (232) to the intake tube (11) of the engine and for a duration of error diagnosis, connects the pump outlet (232) to the air outlet (21) of the filter housing (17) and the pump inlet (231) to a vent opening.

8. A device in accordance with claim 5, in which the feed pump (23) has a pump rotor with a constant direction of rotation and with a pump inlet and pump outlet (231, 232), and that for reversing a feeding direction the switchover valve (24) is provided, which for a duration of filter regeneration connects the pump inlet (231) to the air outlet (21) of the filter housing (17) and the pump outlet (232) to the intake tube (11) of the engine and for a duration of error diagnosis, connects the pump outlet (232) to the air outlet (21) of the filter housing (17) and the pump inlet (231) to a vent opening.

9. A device in accordance with claim 6, in which the feed pump (23) has a pump rotor with a constant direction of rotation and with a pump inlet and pump outlet (231, 232), and that for reversing a feeding direction the switchover valve (24) is provided, which for a duration of filter regeneration connects the pump inlet (231) to the air outlet (21) of the filter housing (17) and the pump outlet (232) to the intake tube (11) of the engine and for a duration of error diagnosis, connects the pump outlet (232) to the air outlet (21) of the filter housing (17) and the pump inlet (231) to a vent opening.

10. A device in accordance with claim 7, in which the switchover valve (24) is embodied as a multiposition 5/2-way valve, including five valve connections (241–245) in which first and second valve connections (241, 242) are connected to the pump outlet and pump inlet (232, 231); the third valve connection (243) is connected to the intake tube (11); the fourth valve connection (244) is connected to the air outlet (21) of the filter housing (17), and the fifth valve connection (245) is embodied as a ventilation opening, and that a control slide of the multiposition valve is embodied in such a way that in a first switching position of the multiposition valve, the first and third valve connections, (241 and 243) are connected to each other, the second and fourth valve connections (242, 244) are connected to one another, and in a second switching position of the multiposition valve the first and fourth valve connections (241 and 244) are interconnected and the second and fifth valve connections (242, 245) are connected to one another, and the third valve connection (243) is closed.

11. A device in accordance with claim 8, in which the switchover valve (24) is embodied as a multiposition 5/2-way valve, including five valve connections (241–245) in which first and second valve connections (241, 242) are connected to the pump outlet and pump inlet (232, 231); the third valve connection (243) is connected to the intake tube (11); the fourth valve connection (244) is connected to the air outlet (21) of the filter housing (17), and the fifth valve connection (245) is embodied as a ventilation opening, and that a control slide of the multiposition valve is embodied in such a way that in a first switching position of the multiposition valve, the first and third valve connections, (241 and 243) are connected to each other, the second and fourth valve connections (242, 244) are connected to one another, and in a second switching position of the multiposition valve the first and fourth valve connections (241 and 244) are interconnected and the second and fifth valve connections (242, 245) are connected to one another, and the third valve connection (243) is closed.

12. A device in accordance with claim 9, in which the switchover valve (24) is embodied as a multiposition 5/2-way valve, including five valve connections (241–245) in which first and second valve connections (241, 242) are connected to the pump outlet and pump inlet (232, 231); the third valve connection (243) is connected to the intake tube (11); the fourth valve connection (244) is connected to the air outlet (21) of the filter housing (17), and the fifth valve connection (245) is embodied as a ventilation opening, and that a control slide of the multiposition valve is embodied in such a way that in a first switching position of the multiposition valve, the first and third valve connections, (241 and 243) are connected to each other, the second and fourth valve connections (242, 244) are connected to one another, and in a second switching position of the multiposition valve the first and fourth valve connections (241 and 244) are interconnected and the second and fifth valve connections (242, 245) are connected to one another, and the third valve connection (243) is closed.

13. A device in accordance with claim 10, in which the multiposition valve is an electromagnet valve with spring restoration, which in an unexcited position of repose assumes the first switching position and in an excited working position assumes the second switching position.

14. A device in accordance with claim 11, in which the multiposition valve is an electromagnet valve with spring restoration, which in an unexcited position of repose assumes the first switching position and in an excited working position assumes the second switching position.

15. A device in accordance with claim 12, in which the multiposition valve is an electromagnet valve with spring restoration, which in an unexcited position of repose assumes the first switching position and in an excited working position assumes the second switching position.

16. A device in accordance with claim 1, in which the air feed pump (23) is selected from a group including a pump piston, a diaphragm pump or a vane cell pump.

17. A device in accordance with claim 3, in which the air feed pump (23) is selected from a group including a pump piston, a diaphragm pump or a vane cell pump.

18. A device in accordance with claim 4, in which the air feed pump (23) is selected from a group including a pump piston, a diaphragm pump or a vane cell pump.

19. A device in accordance with claim 7, in which the air feed pump (23) is selected from a group including a pump piston, a diaphragm pump or a vane cell pump.

* * * * *